(12) United States Patent
Chiang et al.

(10) Patent No.: US 6,999,135 B2
(45) Date of Patent: Feb. 14, 2006

(54) PIXEL STRUCTURE AND FABRICATING METHOD THEREOF

(75) Inventors: Chih-Hung Chiang, Taoyuan (TW); Daisuke Nishino, Taipei (TW)

(73) Assignees: Quanta Display Inc., Taoyuan (TW); Sharp Corporation, Osaka (JP)

( * ) Notice: Subject to any disclaimer, the term of this patent is extended or adjusted under 35 U.S.C. 154(b) by 0 days.

(21) Appl. No.: 10/605,323

(22) Filed: Sep. 23, 2003

(65) Prior Publication Data
US 2005/0036079 A1  Feb. 17, 2005

(30) Foreign Application Priority Data
Aug. 12, 2003 (TW) .............................. 92122053 A

(51) Int. Cl.
 *G02F 1/136* (2006.01)
(52) U.S. Cl. .................... 349/43; 349/39; 349/54; 349/192
(58) Field of Classification Search .................. 349/39, 349/43, 54, 139, 192
See application file for complete search history.

(56) References Cited

U.S. PATENT DOCUMENTS

| | | | | |
|---|---|---|---|---|
| 5,173,792 A | * | 12/1992 | Matsueda | 349/54 |
| 2001/0052889 A1 | * | 12/2001 | Fukunishi | 345/87 |
| 2003/0030768 A1 | * | 2/2003 | Sakamoto et al. | 349/113 |

\* cited by examiner

*Primary Examiner*—Andrew Schechter
*Assistant Examiner*—Thanh-Nhan (Nancy) P. Nguyen
(74) *Attorney, Agent, or Firm*—Jianq Chyun IP Office

(57) ABSTRACT

A pixel structure and a fabricating method thereof are described. The method comprises forming a conductive layer, a data line and a source/drain at the same time. The conductive layer has a coupling portion and a connecting portion. The coupling portion is used as a top electrode of a pixel storage capacitor, and the connecting portion connects the coupling portion and the drain. Thereafter, a contact window is defined on the connecting portion, and a pixel electrode formed subsequently can be electrically connected to the connecting portion through the contact window. Thus, the pixel electrode, the conductive layer (includes the coupling portion) and the drain are electrically connected each other. Since the contact window is not formed above the pixel storage capacitor, the leakage of the pixel storage capacitor will not occur when the etching process of the contact window etches away the gate insulating layer.

11 Claims, 4 Drawing Sheets

PIXEL STRUCTURE AND FABRICATING METHOD THEREOF

CROSS REFERENCE TO RELATED APPLICATIONS

This application claims the priority benefit of Taiwan application serial no. 92122053, filed on Aug. 12, 2003.

BACKGROUND OF INVENTION

1. Field of the Invention

This invention generally relates to a pixel structure for a thin film transistor array and a fabricating method thereof, and more particularly to a pixel structure and a fabricating method thereof to prevent the pixel storage capacitor from leakage.

2. Description of the Related Art

A thin film transistor liquid crystal display (TFT LCD) includes a thin film transistor array, a color filter array, and a liquid crystal layer. The thin film transistor array includes a plurality of thin film transistors arranged in arrays and a plurality of pixel electrodes corresponding to the plurality of thin film transistors to form a plurality of pixel structures. The thin film transistor includes a gate electrode, a channel, a source electrode, and a drain electrode, which is the switch of the liquid crystal display unit.

FIG. 1 is the top view of a pixel structure of the conventional TFT array. This pixel structure is set on a substrate (not shown) and includes a gate line 102, a data line 104, a thin film transistor 130, a pixel storage capacitor 116 and a pixel electrode 112.

The thin film transistor 130 includes a gate electrode 106, a channel layer 108, a source electrode 110a and a drain electrode 110b. The gate electrode 106 is electrically connected to the gate line 102. The source electrode 110a is electrically connected to the data line 104. The drain 110b is electrically connected to the pixel electrode 112 through the contact window 114.

The pixel storage capacitor 116 includes a bottom electrode 118, a top electrode 120, and a dielectric layer between the bottom electrode 118 and the top electrode 120. The top electrode 120 is electrically connected to the pixel electrode 112 through the contact window 122. The bottom electrode 118 is a common line, and is in the Metal 1 layer as same as the gate line 102 and the gate electrode 106. The top electrode 120, the data line 104, and the source/drain electrodes are in the Metal 2 layer. A gate insulating layer (not shown) is disposed between the Metal 1 and Metal 2 layers. A passivation layer (not shown) is disposed between the Metal 2 layer and the pixel electrode 112.

It should be noted that there are terminals at the two edges of the substrate (not shown) to electrically connect the driver circuit. Those terminals are a part of the Metal 1 layer, and the data line 104 and the gate line 102 extending to the edges of the substrate are electrically connected to the terminals.

To expose the terminals for connecting the driver circuit, the gate insulating layer and the passivation above the terminals have to be etched. However, to expose the contact windows 114 and 122, only the passivation layer has to be etched, especially to expose the contact window 122. Because the contact window 122 is above the pixel storage capacitor 116, if the gate insulating layer is etched away, it will cause leakage between the top electrode 118 and the bottom electrode 120 of the capacitor 116. Hence, the steps of etching the passivation layer and the gate insulating layer are very critical to TFT manufacturing processes.

A conventional method to overcome the above problem is to form an amorphous silicon layer below the contact window, which is defined by the channel layer of the thin film transistor. This method uses the amorphous silicon layer as a stop layer to prevent the gate insulating layer below the contact window from etching through. However, the etch selectivity between the amorphous silicon layer and the gate insulating layer is very critical.

According to another conventional method for forming an opening at the bottom electrode below the contact window; i.e., the bottom electrode below the contact window is removed. Hence, even if the gate insulating layer below the contact window is etched through, because the bottom electrode has been removed, no leakage occurs. However, this method requires precise alignment of the opening with the contact window, which is difficult to achieve.

SUMMARY OF INVENTION

An object of the present invention is to provide a pixel structure and a fabricating method thereof to prevent the pixel storage capacitor from leakage.

The present invention provides a pixel structure, comprising: a gate line on a substrate; a common line on the substrate for a bottom electrode of a pixel storage capacitor; a gate insulating layer on the substrate, the gate insulating layer covering the gate line and the common line; a data line on the gate insulating layer; a switching device on the substrate, the switching device electrically connecting the gate line and the data line; a conducting layer on the gate insulating layer, the conducting layer including a coupling portion and a connecting portion, the coupling portion being above the common line for a top electrode of the pixel storage capacitor, the connecting portion connecting the coupling portion and the switching device; a passivation layer covering the data line, the switching device, and the conducting layer; a contact window disposed in the passivation layer and above the connecting portion; and a pixel electrode on the passivation layer, the pixel electrode electrically connecting the switching device and the coupling portion of the conducting layer through the contact window. Hence, the pixel electrode, the whole conducting layer (including the coupling portion) and the switching device are electrically connected.

In a preferred embodiment of the present invention, the connecting portion of the conducting layer is a multi-channel structure. The connecting portion comprises a first portion coupled to the coupling portion; a second portion connected to the switching device; and a third portion between the first portion and the second portion; the third portion includes a plurality of channels. The contact window is disposed in the passivation layer and above one of the plurality of channels of the third portion. A planarization layer is between the passivation and the pixel electrode.

The present invention also provides a method of fabricating a pixel structure, comprising, sequentially forming a gate electrode, a gate line and a common line on a substrate, wherein the gate line is electrically connected to the gate electrode; forming a gate insulating layer on the substrate to cover the gate electrode, the gate line, and the common line; forming a channel layer above the gate insulating layer and the gate electrode; forming a data line and a conducting layer on the gate insulating layer and forming a source electrode and a drain electrode on the channel layer, the data line being electrically connected to the source electrode, the conducting layer including a coupling portion and a connecting portion, the coupling portion being formed above the common line, the connecting portion connecting the coupling portion and the drain electrode; forming a passivation layer above the substrate to cover the data line, the conducting layer and the thin film transistor; forming a contact window in the passivation layer to expose the connecting portion; and forming a pixel electrode on the passivation layer, the pixel electrode being electrically connected to the conducting layer through the contact window.

In a preferred embodiment of the present invention, the connecting portion of the conducting layer includes a plurality of channels. The contact window exposes one of plurality of channels of the connecting portion. Before the step of forming the pixel electrode, further comprises forming a planarization layer on the passivation.

Because in the pixel structure of the present invention, the pixel electrode, the drain electrode and the top and bottom electrodes are electrically connected through the same contact window, the pixel structure of the present invention is different from the conventional pixel structure.

Since in the pixel structure of the present invention, the contact window is not set above the pixel storage capacitor, the leakage would not occur even if the passivation layer and the gate insulating layer are etched through.

The above is a brief description of some deficiencies in the prior art and advantages of the present invention.

Other features, advantages and embodiments of the invention will be apparent to those skilled in the art from the following description, accompanying drawings and appended claims.

DETAILED DESCRIPTION

Figure 1:
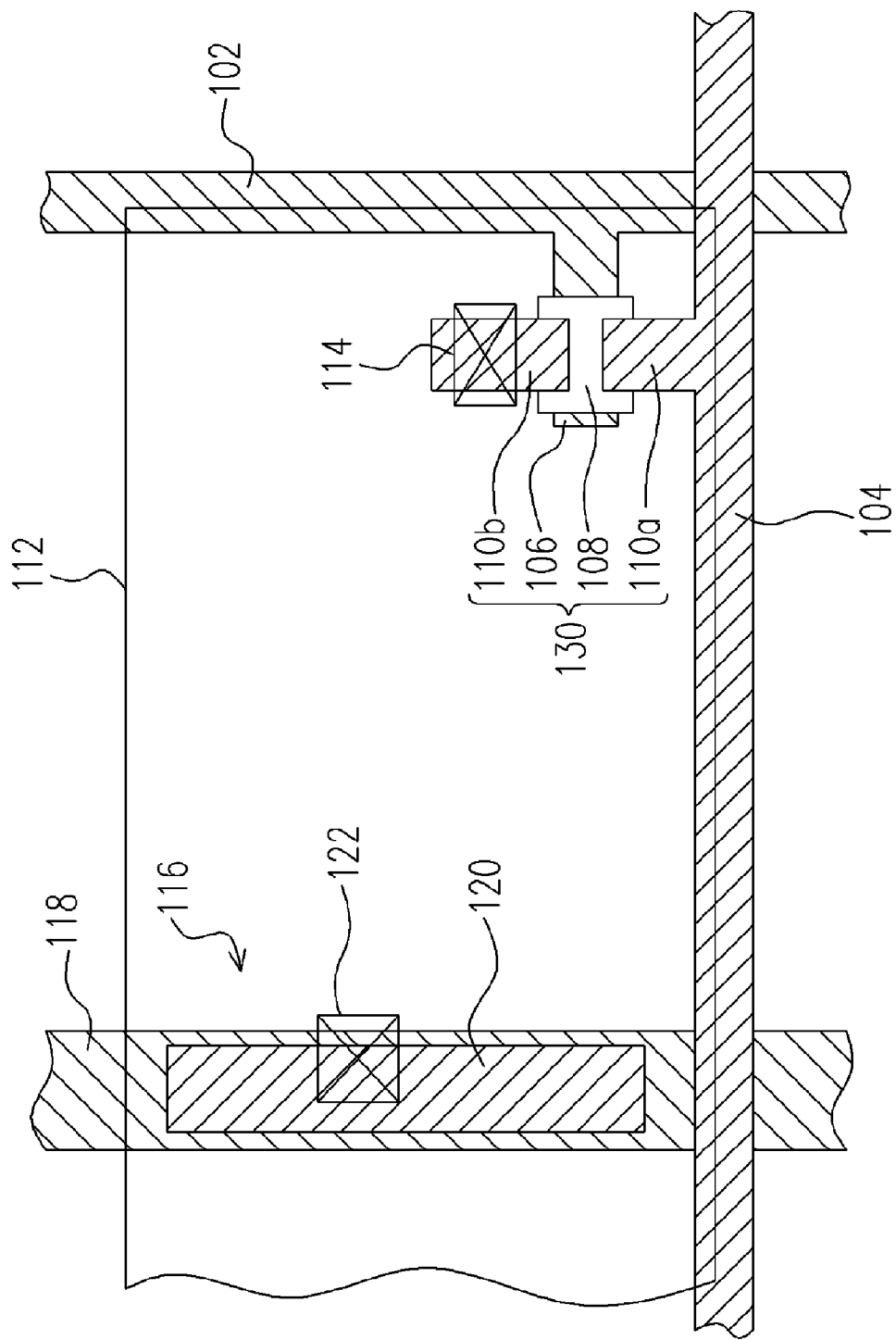
FIG. 1 is a top view of a conventional pixel structure of the TFT array.
Figure 2:
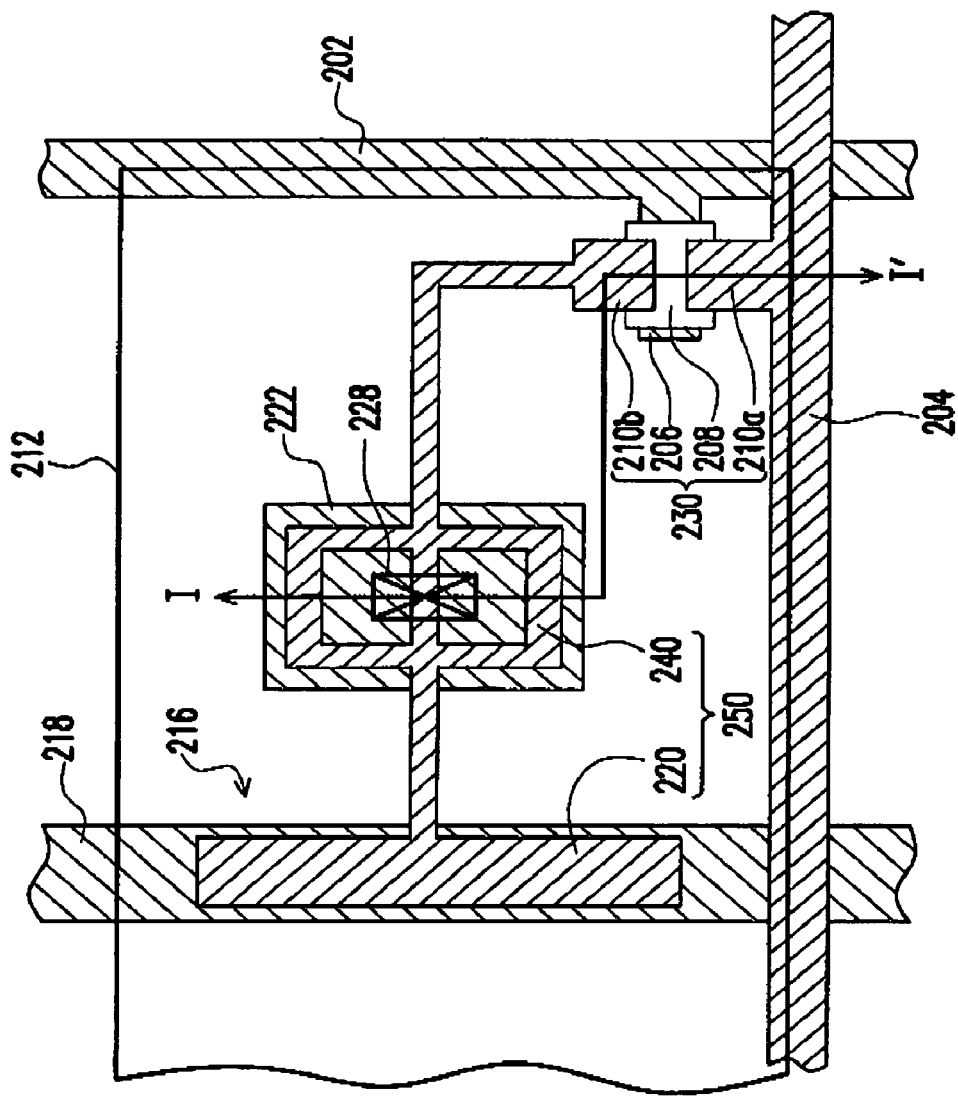
FIG. 2 is a top view of a pixel structure of the TFT arraying accordance with the preferred embodiment of the present invention.
Figure 3:
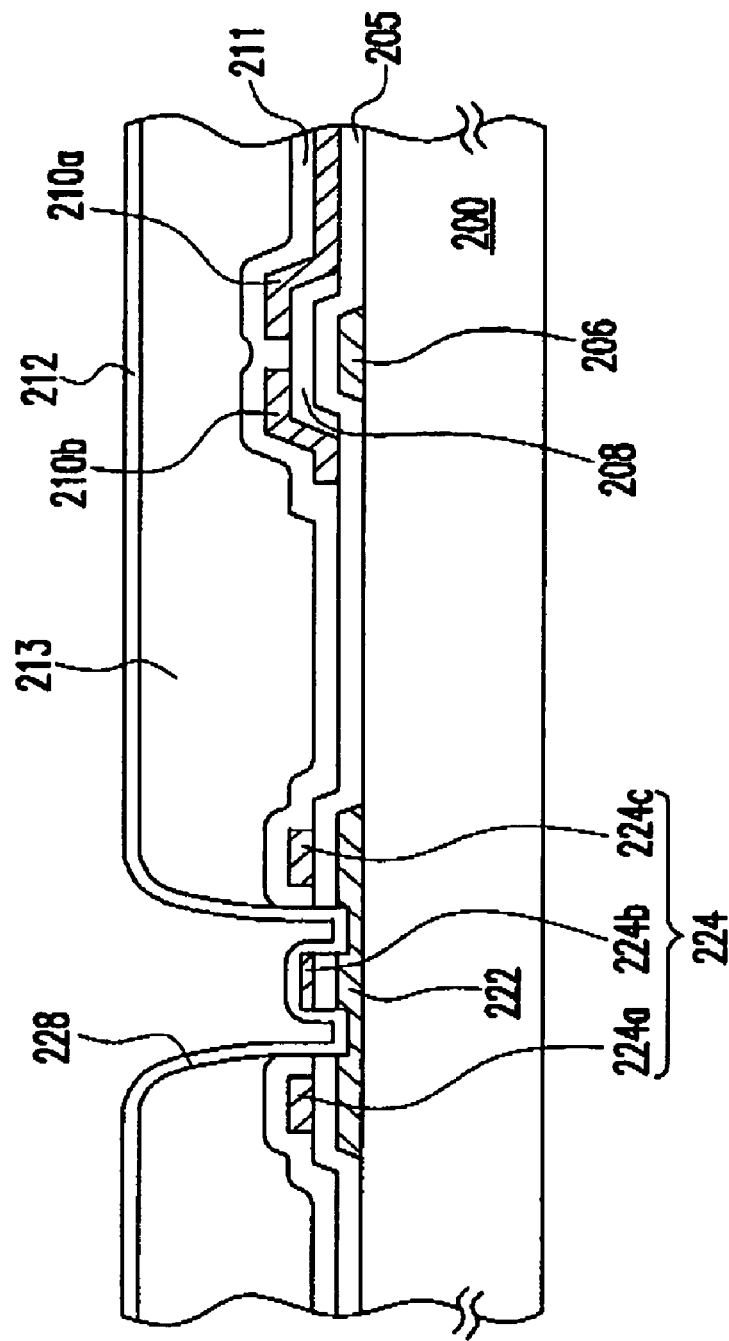
FIG. 3 is a cross-sectional view of FIG. 2 along the I–I' line.

FIG. 2 is the top view of a pixel structure of the TFT arraying accordance with the preferred embodiment of the present invention. FIG. 3 is the cross-sectional view of FIG. 2 along the 1–1" line. The method of fabricating a pixel structure of the present invention includes providing a substrate 200, wherein the substrate 200 is comprised of a glass substrate or a plastic substrate. Then a gate electrode 206, a gate line 202, and a common line 218 are formed over the substrate 200, wherein the gate line 202 is electrically connected to the gate electrode 206 and the common line 218 is parallel to the gate line 202. The common line is for forming the bottom electrode of the pixel storage capacitor 216 in the subsequent processes. The gate electrode 206, the gate line 202 and the common line 218 belong to Metal 1 layer.

Metal 1 layer further includes a plurality of terminals at the two edges of the substrate (not shown) and the subsequently formed data line and the gate line 202 extending to the edges of the substrate are electrically connected to the terminals.

Then a gate insulating layer 205 is formed on the substrate 200 to cover Metal 1 layer (including the gate electrode 206, the gate line 202 and the common line 218). In a preferred embodiment of the present invention, the material of the gate dielectric layer is silicon nitride or silicon oxide.

Next, a channel layer 208 is formed on the gate insulating layer 205. In a preferred embodiment of the present invention, the material of the channel layer 208 is an amorphous silicon, and an ohmic contact layer is formed on the surface of the channel layer 208 (not shown) to improve the electrical contact of the channel layer 208 and the subsequent formed source/drain electrodes.

Then a data line 204 and a conducting layer 250 (shown in FIG. 4) are formed on the gate insulating layer 205, and the source/drain electrodes 210a/210b are formed on the channel layer 208. The data line 204, the conducting layer 250, and the source/drain electrodes 210a/210b belong to Metal 2 layer. The source electrode is electrically connected to the data line 204. The gate electrode 206, the channel 208, and the source/drain electrodes 210a/210b constitute a thin film transistor.

The conducting layer 250 includes a coupling portion 220 and a connecting portion 240. The coupling portion 220 is formed above the common line 218 and is for forming the top electrode of the pixel storage capacitor 216. The connecting portion 240 connects the coupling portion 220 and the drain electrode 210b.

Figure 4:
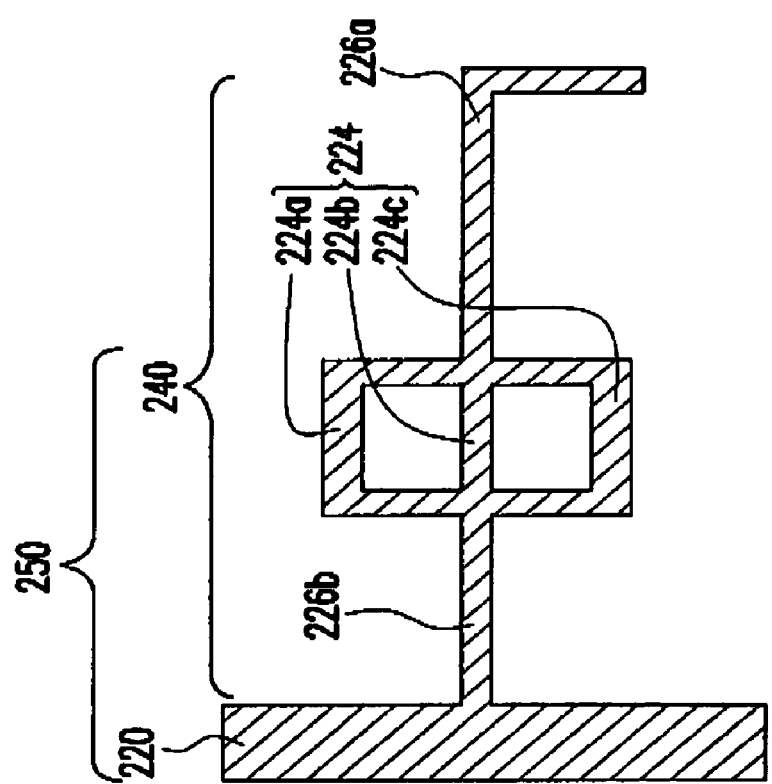
FIG. 4 is a top view of the conducting layer of FIG. 2.

In a preferred embodiment of the present invention, the connecting portion 240 can be comprised of a multi-channel structure. As shown in FIG. 4, the connecting portion 240 includes a first portion 226a connected to the drain electrode 210b, a second portion 226b connected to the coupling portion 220, and a third portion 224 between the first portion 226a and the second portion 226b. The third portion 224 is a multi-channel structure. FIG. 4 illustrates a three-channel structure as an example, which includes three channels 224a, 224b, and 224c. The purpose of the multi-channel structure is for later defining the contact window above one of the channel, e.g., above the channel 224b. The other channels 224a and 224c are responsible for transmitting carriers. If one of the channels (e.g., channel 224a) cannot conduct due to the process defect or other reasons, the remaining channels (e.g., channel 224c) still can transmit carriers.

It should be noted that a blocking layer 222 can be formed below the third portion 224 of the connecting portion 240. The blocking layer 222 belongs to Metal 1 layer. That is, the blocking layer 222 is defined by defining the gate electrode 206, the gate line 202, and the common line 218. The purpose of forming the blocking layer 222 is to block the scattering light due to the later formed contact window.

After forming Metal 2 layer (including the data line 204, the conducting layer 250, and the source/drain electrodes 210a/210b), a passivation layer 211 is formed on the substrate 200 to cover Metal 2 layer. The material of the passivation is comprised of silicon nitride or silicon oxide. Then a planarization layer 213 is formed on the passivation layer 211. The material or the planarization layer is an organic photosensitive material.

Next, a contact window 238 is formed by patterning the planarization layer 213 and the passivation layer 211 to expose a portion of the connecting portion 240. In a preferred embodiment of the present invention, the contact window 228 exposes the channel 224b of the connecting portion 240. If Metal 2 layer uses Ti/Al as a two-layer metal layer, the Al layer above the channel 224b may be removed during the etching process to define the contact window 228. Hence, the channel 224b is thinner than the channels 224a and 224c as shown in FIG. 3.

It should be noted that because the contact window 228 of the present invention is not defined directly above the pixel storage capacitor 216, the leakage would not occur even if the gate insulating layer 205 is etched through. Further, because the blocking layer 222 is below the contact window 228, which is not electrically connected to the other conducting material layers, the device will not be affected.

Next, a pixel electrode 212 is formed on the surface of the planarization layer 213. The pixel electrode 212 is electrically connected to the connecting portion 240 (i.e., the channel 224b) through the contact window 228.

Because the coupling portion 220 of the conducting layer 250 is connected to the drain electrode 210b through the connecting portion 240 and the pixel electrode 212 is electrically connected to the connecting portion 240, the pixel electrode 212, the conducting layer (including the coupling portion 220 and the connecting portion 240), and the drain electrode 210b are electrically connected.

The pixel structure of the present invention includes a gate line 202, a common line 218, a gate insulating layer 205, a data line 204, and a switching device 230 such as a thin film transistor, a conducting layer 250, a passivation layer 211, a planarization layer 213, a contact window 228, and a pixel electrode 212.

The gate line 202 is set on the substrate 200. The common line 218 is also set on the substrate 200 as the bottom electrode of the pixel storage capacitor 216. The common line 218 is parallel to the gate line 202.

The gate insulating layer 205 is set on the substrate 200 to cover the gate line 202 and the common line 218. The data line 204 is set on the gate insulating layer 205.

In addition, the switching device 230 such as a thin film transistor is set on the substrate 200. The thin film transistor 230 includes a gate electrode 206, a channel layer 208, and source/drain electrodes 210a/210b. The gate electrode is electrically connected to the gate line 202. The channel layer 208 is set on the gate insulating layer 205. The source/drain electrodes 210a/210b are set on the channel layer 208. The source electrode 210a is electrically connected to the data line 204.

Further, the conducting layer 250 is set on the gate insulating layer 205. The conducting layer 250 includes a coupling portion 220 and a connecting portion 240. The coupling portion 220 is formed above the common line 218 and is for the top electrode of the pixel storage capacitor 216. The connecting portion 240 connects the coupling portion 220 and the drain electrode 210b. In a preferred embodiment of the present invention, the connecting portion 240 can be defined as a multi-channel structure. As shown in FIG. 4, the connecting portion 240 includes a first portion 226a connected to the drain electrode 210b, a second portion 226b connected to the coupling portion 220, and a third portion 224 between the first portion 226a and the second portion 226b. The third portion 224 is a multi-channel structure. A blocking layer 222 is set below the third portion 224 of the connecting portion 240. The blocking layer 222, the gate line 202, and the common line 218 belong to Metal 1 layer. The purpose of forming the blocking layer 222 is to block the scattering light due to the later formed contact window.

In addition, a passivation layer 211 covers the data line 204, the thin film transistor 230 and the conducting layer 250. A planarization layer 213 is set on the passivation layer 211.

A contact window 238 is set in the planarization layer 213 and the passivation layer 211 and is electrically connected to the connecting portion 240. In a preferred embodiment of the present invention, the contact window 228 is set in the planarization layer 213 and the passivation layer 211 above the channel 224b, and is electrically connected to the channel 224b of the connecting portion 240.

A pixel electrode 212 is set on the surface of the planarization layer 213. The pixel electrode 212 is electrically connected to the connecting portion 240 (i.e., the channel 224b) through the contact window 228. Because the channel 224b is electrically connected to the pixel electrode 212, the pixel electrode 212 is electrically connected to the whole conducting layer 250. Because the conducting layer 250 is connected to the drain electrode 210b through the connecting portion 240, the pixel electrode 212, the conducting layer (including the coupling portion 220 and the connecting portion 240), and the drain electrode 210b are electrically connected.

Because in the pixel structure of the present invention, the pixel electrode, the drain electrode, and the top and bottom electrodes are electrically connected through the same contact window, the pixel structure of the present invention is different from the conventional pixel structure.

Since in the pixel structure of the present invention the contact window is not set above the pixel storage capacitor, the leakage would not occur even if the passivation layer and the gate insulating layer are etched through.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

The invention claimed is:

1. A pixel structure, comprising:
   a gate line, located on a substrate;
   a common line, located on said substrate for a bottom electrode of a pixel storage capacitor;
   a gate insulating layer, located on said substrate, said gate insulating layer covering said gate line and said common line;
   a data line, located on said gate insulating layer;
   a switching device, located on said substrate, said switching device electrically connecting said gate line and said data line;
   a conducting layer, located on said gate insulating layer, said conducting layer including a coupling portion and a connecting portion, said coupling portion being above said common line for a top electrode of said pixel storage capacitor, s aid connecting portion comprising a first portion, a second portion and the third portion, wherein said first portion is coupled to said coupling portion, said second portion is connected to said switching device and said third portion located between said first portion and said second portion possesses a plurality of channels;
   a passivation layer, covering said data line, said switching device, and said conducting layer;
   a contact window, disposed in said passivation layer and above said third portion of said connecting portion; and
   a pixel electrode, located on said passivation layer, said pixel electrode electrically connecting said switching device and said coupling portion of said conducting layer through said contact window.

2. The pixel structure of claim 1, further comprising a blocking layer below said connecting portion.

3. The pixel structure of claim 1, further comprising a planarization layer between said passivation and said pixel electrode.

4. The pixel structure of claim 1, wherein said switching device is a thin film transistor, said thin film transistor comprising:
   a gate electrode electrically connected to said gate line;
   a channel layer on the gate insulating layer above said gate electrode;
   a source electrode and a drain electrode on said channel layer, said source electrode being electrically connected to said data line, said drain electrode being electrically connected to said connecting portion of said conducting layer.

5. The pixel structure of claim 1, wherein said gate line is parallel to said common line.

6. A pixel structure, comprising:
   a gate line located on a substrate;
   a common line located on the substrate for a bottom electrode of a pixel storage capacitor;
   a blocking layer located on the substrate between the gate line and the common line;
   a gate insulating layer located over the substrate;
   a data line located on the gate insulating layer;
   a switching device located on the substrate, wherein the switching device is electrically connected to the gate line and the data line;
   a conducting layer located on the gate insulating layer, wherein the conducting layer includes a coupling portion and a connecting portion, the coupling portion is located above the common line for a top electrode of the pixel storage capacitor and the connecting portion is connected to the coupling portion and the switching device and is located above the blocking layer,
   a passivation layer covering the data line, the switching device, and the conducting layer;
   a contact window disposed in the passivation layer and the gate insulating layer above the connecting portion, wherein the contact window exposes a portion of the blocking layer and a portion of the connecting portion over the exposed blocking layer; and
   a pixel electrode located on the passivation layer, wherein the pixel electrode is electrically connected the switching device to the coupling portion of the conducting layer through the portion of the connecting portion exposed by the contact window and the pixel electrode is in contact with the portion of the blocking layer exposed by the contact window.

7. The pixel structure of claim 6, wherein the connecting portion of the conducting layer is a multi-channel stricture, the connecting portion comprising:
   a first portion coupled to the coupling portion;
   a second portion connected to the switching device; and
   a third portion between the first portion and the second portion, the third portion including a plurality of channels.

8. The pixel structure of claim 7, wherein the contact window is disposed in the passivation layer and above one of the plurality of channels of the third portion.

9. The pixel structure of claim 6, further comprising a planarization layer between the passivation and the pixel electrode.

10. The pixel structure of claim 6, wherein the switching device is a thin film transistor, the thin film transistor comprising:
   a gate elect-ode electrically connected to die gate line;
   a channel layer on the gate insulating layer above the gate electrode;
   a source electrode and a drain electrode on the channel layer, the source electrode being electrically connected to the data line, the drain electrode being electrically connected to the connecting portion of the conducting layer.

11. The pixel structure of claim 6, wherein the gate line is parallel to the common line.

* * * * *